Fig 1

Dec. 3, 1963      A. F. STANDING      3,113,310
NULL SCANNING RADAR
Filed Feb. 10, 1961      5 Sheets-Sheet 2

INVENTOR.
ARTHUR F. STANDING.
BY
ATTORNEYS.

Dec. 3, 1963    A. F. STANDING    3,113,310
NULL SCANNING RADAR
Filed Feb. 10, 1961    5 Sheets-Sheet 3

INVENTOR.
ARTHUR F. STANDING.
BY Alden D. Redfield
Charles M. Hogan
ATTORNEYS.

Dec. 3, 1963

A. F. STANDING 3,113,310

NULL SCANNING RADAR

Filed Feb. 10, 1961

INVENTOR.
ARTHUR F. STANDING.
BY
ATTORNEYS.

United States Patent Office 3,113,310
Patented Dec. 3, 1963

3,113,310
NULL SCANNING RADAR
Arthur F. Standing, Loveland, Ohio, assignor to Avco Corporation, Cincinnati, Ohio, a corporation of Delaware
Filed Feb. 10, 1961, Ser. No. 88,578
16 Claims. (Cl. 343—16)

The present invention relates generally to radar detection and range finding systems and methods. In its broad aspects the invention provides a new technique for determining the presence and one or all positional attributes of a target (height, range, and azimuth) by radiating a beam of electromagnetic energy having a null or effectively null sector, moving the beam in one direction or rectangular coordinate and moving the null sector in another coordinate direction to locate a target, and utilizing the discontinuity in echo signals for the desired measurement. In a particular embodiment herein shown in detail, the beam is angularly positioned to sweep in azimuth while the null is nodded to scan in elevation.

The invention further provides a novel height-finding or combined search and height-finding radar which exploits the novel null scanning technique for height finding.

It is generally recognized that conventional three-dimensional radar approaches are not entirely satisfactory. Prior art equipments are subject to the disadvantages and limitations of being too slow, ambiguous in their indications, unreliable, or excessively costly and refined. One of the factors which render the conventional pencil-beam approach, for example, too slow, is the dependence of the azimuth-sweep data rate on the elevational-scan data rate. The azimuth data rate of an operable three-dimensional radar system is limited by the need for a sufficient number of hits per scan to provide reliable target detection. It is for this reason that supersonic target speeds render known radar techniques too slow. The azimuth data rate in a conventional system imposes a limitation on it, in that such rate must be slow enough to permit energy radiated in a narrow pencil beam to score several hits in elevational scan for each azimuthal sweep. This limitation impairs the capability of conventional systems to handle multiple targets. Increasing the width of the beam in order to permit an increase in the azimuthal data rate impairs the accuracy of both height and azimuth information.

The present invention is premised not only on a realization of the importance of this problem, but it provides a solution, believed to be fundamental in nature.

While the outstanding feature of the invention is the superior immunity against jamming which characterizes it when tracking a target, an important object of the invention is to achieve independence between the azimuthal search and height scan data rates, so that each can be optimized, the one not imposing a limitation on the other.

A related object of the invention is to provide a three-dimensional radar having a search data rate characterized by an order of magnitude higher than an electronically scanning pencil beam radar of comparable elevation coverage and range detection capability.

A further object of the invention is to provide a three-dimensional radar having a search rate comparable to that of a conventional two-dimensional search radar, but relatively free from the ambiguities which limit the reliability and effectiveness, for example, of the stacked beam system.

A further object of the invention is to provide a three-dimensional radar which is not only fast in action, with multiple target detection capabilities, but is further characterized by accuracy equal or superior to that of a pencil beam radar.

A paramount object of the invention is to provide an antenna system which radiates or receives a beam characterized by an effective null sector or discontinuity.

A related object is to provide in such antenna system means for effectively sweeping the beam in one coordinate (such as azimuth) while simultaneously scanning the null sector in another coordinate (such as elevation). When the null sector is "on target," the target indicates its presence by the substantial absence of echo signals as applied to the receiver in the radar system, and the positional attributes of the target are then indicated and displayed.

In the specific embodiment herein shown, there is provided means including a first antenna and proportioned to radiate a main beam of electromagnetic energy having a relatively wide-angled directional pattern in elevation and a relatively narrow angular width in azimuth. This beam is swept in azimuth, as is conventional with search radars.

The invention embraces two basic types of operation. The preferred type contemplates null echo operation, and the other contemplates null transmission. In null echo operation there is provided an array for receiving in a directional pattern which is narrow-angled in elevation. The first antenna alone is employed in transmitting, and both the first antenna and the array are employed in reception. Parenthetically, the first antenna comprises horn 20 and reflector 21 of FIG. 1, while the array comprises the forty-eight elements 23, 24, etc., and the reflector 21. By means shown in FIG. 8, the main beam from the first antenna 20, 21 is stabilized in elevation. Now the array is nodded in elevation so that the narrow receiving pattern scans in elevation within the wide-angled receiving pattern of the first antenna. The echo energy intercepted by the first antenna is cancelled out by the echo energy intercepted by the array when both patterns are "on target," and therefore the incidence of the narrow-angled receiving pattern on the target is accompanied by the substantial absence of echo signals from the target. In this mode of operation, target elevation is indicated by minimum, or substantial absence of echo signals. This type of operation, as indicated, in which 71 (FIGS. 2–5) is effectively a null sector, is referred to as "null echo operation." Now, in null transmission both the central horn antenna, referred to herein as the "first antenna," and the array are utilized in both transmission and reception. Parenthetically, the eqiupment for this mode of operation is identical to that herein shown and described, except that gas switch 89 (FIG. 15) is omitted. In this mode of operation the element 90 shown in FIG. 15 functions simply as a power splitter. The necessary phase relationship between the first antenna and the array is established by the same feed structure as utilized in the preferred embodiment. In this mode of operation a true null sector is produced at 71 in the transmitted beam. The effective null sector method is preferred and is used in the specific embodiment described hereinbelow in detail, although both methods are within the teachings and claims of this invention.

In the preferred specific embodiment herein shown, there are provided a first means for radiating a fan-shaped or "main" beam which is wide in elevation and narrow in azimuth, and means for setting up a receiving pattern coextensive in azimuth but narrow in elevation. Both the beam and the receiving pattern are angularly swept in azimuth while the narrow-angled receiving pattern is nodded in elevation. Only the first means is used for transmitting, but both means are used for receiving echo signals, the echo signals intercepted by the one means being used to cancel out the echo signals intercepted by the other means when the main beam and the narrow reception pattern are both "on target." The means for setting up the narrow receiving pattern, taken together with the cancellation means, effectively establishes a null sector in the over-all receiving pattern, and a nodding means angularly positions this null sector for purposes of elevational scanning.

A further object of the invention is to provide a system which is less vulnerable to jamming action originating at a target when the target is being tracked. Under that condition, systems in accordance with the present invention furnish indications on the basis of the absence of echo, and are therefore relatively immune from this type of jamming.

An additional object of the invention is to provide a combination of radiating means which accomplishes the novel null scanning.

Still another object of the invention is to provide means for suitably processing the received signals so that the absence of echo signals causes an indication to be displayed, preferably in a framework of coordinates indicative of height and range.

For a better understanding of the invention, together with other and further objects, advantages, and capabilities thereof, reference is made to the following description of the appended drawings. The scope of the invention is as stated in the claims which follow this specification.

Figure 1:
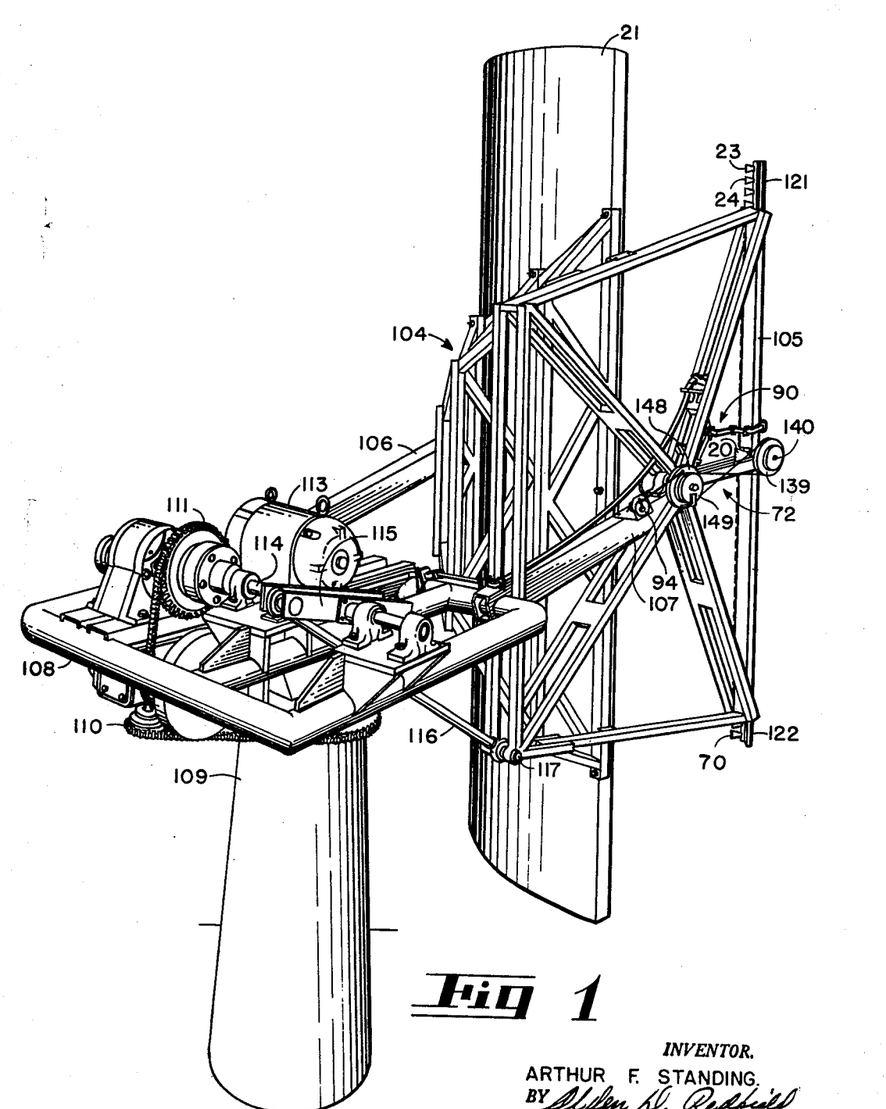
FIG. 1 is a perspective view of the antenna assembly portion of a novel three-dimensional radar system in accordance with the invention.
Figures 2, 3:
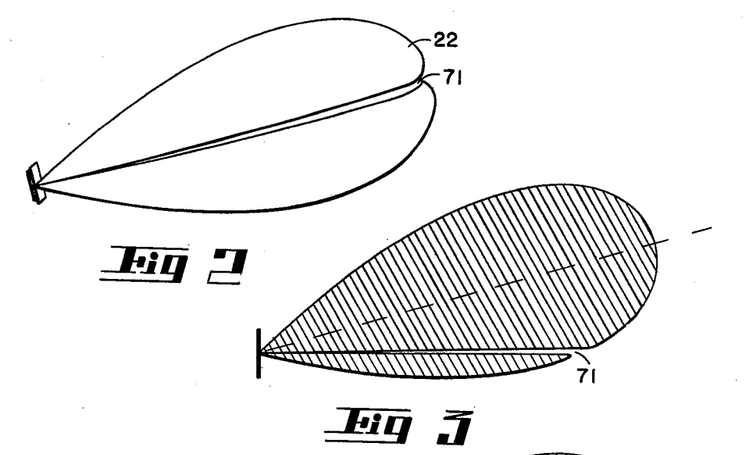
FIG. 2 is a visual construction of the pattern of a beam of electromagnetic energy provided in accordance with the present invention, showing in perspective the null sector therein.
FIGS. 3, 4, and 5 are elevational visualizations of the beam, FIG. 3 showing the null sector substantially parallel to the ground, FIG. 4 showing the null sector at an elevation angle of approximately 15 degrees, and FIG. 5 showing the null sector at 30 degrees of elevation.
Figure 4:
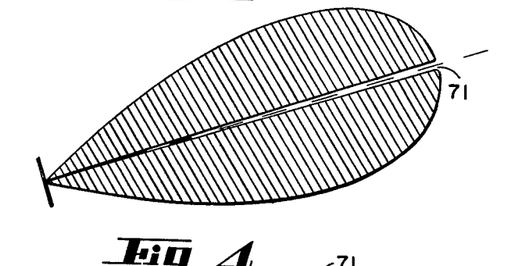
Figure 5:
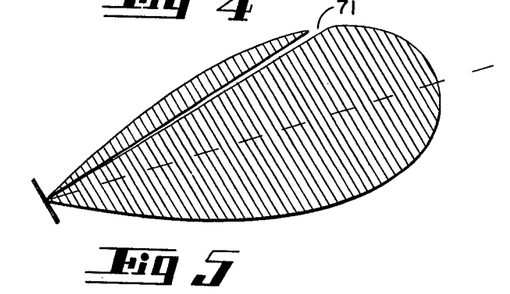
Figure 6:
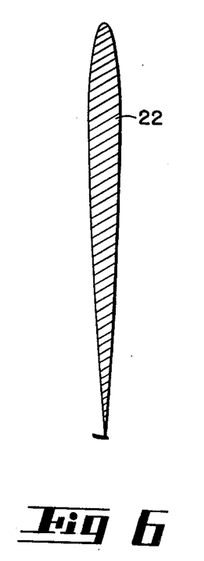
FIG. 6 is a top plan visualization of the beam of FIG. 2, showing that it is narrow in azimuth.

Referring now first to FIG. 1, attention is invited to a first antenna comprising a central horn 20 and a reflector 21, which is linear in elevation and parabolic in azimuth. The central horn is located along the focal axis of the reflector, and is so positioned and arranged that the central horn and reflector constitute a first antenna which radiates a main beam of electromagnetic wave energy 22 having a broad fan-shaped pattern in elevation (FIG. 2) and a narrow angular width in azimuth (FIG. 6). This first antenna alone is used for transmission in the preferred embodiment.

Again referring to FIG. 1, in addition to the first antenna or central horn radiator, which first antenna is used also for reception, there is provided a receiving array consisting of the reflector and a plurality of small horn elements 23, 24, etc., suitably arranged along the focal axis of the reflector and proportioned to provide a directional pattern narrow angled in elevation. This pattern is azimuthally of the same width as the main beam and is referred to herein as a null sector 71. That is, the null sector extends completely across the main beam and any minor side lobes of the main beam. Parenthetically, the reference numerals 23–70 are reversed for the forty-eight small elements of the narrow-angled receiving array.

The sector 71 is referred to as a null sector because of the fact that echo energy received by the narrow-pattern array from a target within the narrow-angled directional pattern 71 is subtracted from echo energy received by the central horn radiator (when functioning as a wave interceptor) to produce substantially zero video signals indicative of a "hit" on the target in elevation. The entire subassembly of reflector, central horn, and small horns 23, 24, etc. (i.e., array elements), is turned in azimuth in the usual manner of search radars, so that the main beam 22 searches or sweeps around the entire horizon. Concurrently, the null sector 71 is nodded in elevation by nodding the reflector 21 and the narrow-angled directional array comprising the elements 23, 24, etc. For the purpose of maintaining the elevational stability and orientation of the main beam 22 while the null sector 71 is being nodded, there is provided means which is generally indicated by the reference numeral 72 for stabilizing and maintaining fixed in elevation the orientation of the central horn 20.

Referring again to FIGS. 2–6, the first antenna comprising the central horn 20 and the reflector 21 radiates a fan-shaped cosecant-squared or otherwise suitably shaped beam 22 of electromagnetic energy having a relatively wide-angled directional pattern in elevation. This beam, commonly referred to herein as the "main beam," is narrow in azimuth, with very minor side lobes. The second antenna, comprising the elements 23, 24, etc., and the reflector 21, is proportioned to provide a narrow-angled directional pattern in elevation. In other words, it is a restricted-pattern receiving array, and the restricted pattern is coextensive with a sector or geometrical portion of the broad elevational pattern of the main beam. The second antenna or array and the radio-frequency (R.F.) canceling means 90 hereinafter described together constitute means for producing a null sector in elevation. The thin fan-shaped main beam 22 is turned in azimuth in the manner of a search radar, and the angular position of the null sector 71 in elevation is varied in order to scan the target. As will be seen by reference to FIGS. 3, 4, and 5, the nodding of the array causes the elevation angle of the null sector 71 to increase to a predetermined maximum and then to decrease to a predetermined minimum, and this action is continued repetitively.

Figures 9, 12:
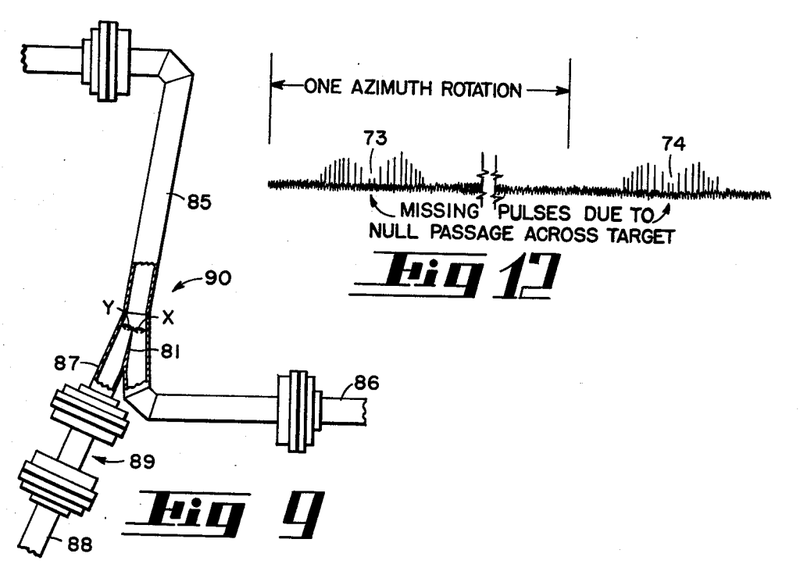
FIG. 9 is a plan view of the radio-frequency mismatch and subtracting device utilized in the invention for the purpose of combining, in opposed phase relationship, energy received by the central horn and echo energy received by the narrow-pattern array in order to produce a substantially null signal indicative of a "hit" in elevation on the target.
FIG. 12 is a graph of video echo signals versus time, time approximating two azimuth sweeps, and the video indicating a plurality of hits per sweep, after the manner of search radars generally, but the video decreasing substantially to zero when the null sector is on target in elevation.

Referring now to FIG. 12, it will be seen that the main beam 22 scores a series of hits on the target during that part of azimuth rotation in which the main beam grossly impinges on the target, the interception of echo energy being indicated by a series of received bursts of energy or pulses (vertical lines, FIG. 12). While this gross impingement is occurring, the restricted array and null sector 71 are nodding. The horizontal axis of FIG. 12 is broken to show that the duration of an azimuth sweep is very long compared to the series of hits. When the null sector is on target in elevation, the echo signals as applied to the receiver of the radar used in this system decrease substantially to zero or to minimal values. It will be seen that, while the system functions in the usual manner of a search radar so far as a series of hits in each azimuthal rotation is concerned, the position of a target in elevation is detected by a substantially null echo signal, as indicated by the short pulse 73 in FIG. 12. During the succeeding azimuth sweep, there occurs a similar series of hits when the main beam is on target, and, as the null sector is aimed in elevation on the target, there occurs another null signal 74. That is to say, the target reveals its elevation position or height by substantial absence of echo.

The principle of the invention will now be understood by those skilled in the art.

Figure 15:
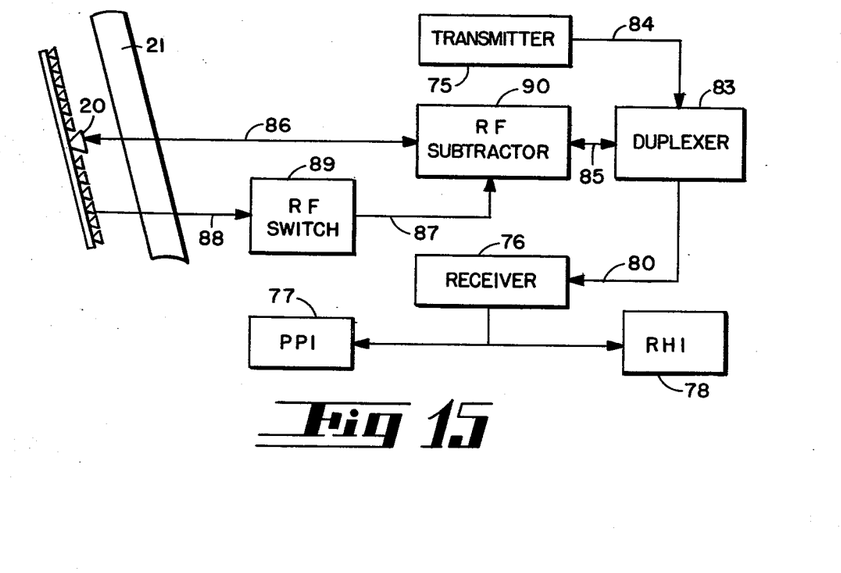
FIG. 15 is a block diagram of a complete three-dimensional radar system in accordance with the invention.

Reference is now made to the system block diagram in FIG. 15. The system includes a conventional pulse wave radar transmitter 75 and radar receiver 76. The receiver video output is applied to a suitable plan-position indicator display 77 and a range-height indicator 78. The receiver and transmitter are coupled to the central horn 20 antenna, which is employed for both transmission and reception. In the case of the transmitter, the coupling is by suitable radar-frequency lines and guides indicated by the reference numerals 84, 85 and 86. In the case of the receiver, the coupling is by lines and guides indicated by the reference numerals 86, 85 and 80. A conventional duplexer or transmit-receive switch—commonly known as a T=R box—83 is conventionally arranged to decouple the receiver from the transmitter during transmission and to couple the receiver to the wave interceptors during reception. The narrow-pattern array or second antenna means described above is employed on reception only, and the receiver is coupled to it via the lines and guides indicated by the reference numerals 88, 87, 85, and 80, a radio-frequency or gas switch 89 being inserted in this coupling to decouple the transmitter 75 from the narrow-pattern array during transmission.

Attention is now invited to the radio frequency subtractor 90 in FIG. 15, where it is shown in block (the details of the subtractor 90 being disclosed in FIG. 9). What this subtractor does is to combine the echo energy from the main beam, coming from the central horn antenna via line 86, and the echo energy from the narrow-pattern array, passing through lines 88 and 87 and the gas switch 89 (which is open-circuited during reception) in such a manner as to reduce substantially to zero the resultant signals passing down wave guide 85 when the narrow-pattern beam is on target in elevation. In order to reduce the gain of the narrow-angled array to the same value as that of the central horn antenna, controlled mismatch is introduced into the feed structure leading to the narrow-angled array. The desired null signal indication is achieved by correctly phasing the signals from the broad-beam antenna and from the mismatched narrow-beam array and feeding them into the R.F. subtractor 90, which is essentially a power splitter or divider.

The microwave network 90 illustrated in FIG. 9 performs these functions:

(1) It radiates the surplus echo energy intercepted by the multi-horn array and equates it in quantum to the echo energy intercepted by the central horn antenna;

(2) It combines the two categories of echo energy in a 180-degree phase relationship when the null sector is on target in elevation.

The network 90 is essentially a power splitter and mismatch device. The power splitter or subtractor 90 has a narrow septum 81 placed across the broad dimension of the guide. The power-splitting properties of this septum are derived from the fact that the power division does not change the field within the guide but does change its relative impedance according to the septum position. For correct subtraction, then, the position of the septum is so adjusted that the two narrow guide dimensions X and Y at the end of the septum bear the correct impedance ratio to give the desired power ratio. The broad dimension of the wave-guides 85, 86, 87 is transverse to the FIG. 9 view. Then the phasing of the signals fed into the two arms of this power divider is adjusted so that at the top of the septum the two signals (echo signals from central horn and echo signals from array) are 180 degrees out of phase. This can be readily achieved by adjusting the length of waveguide in the feed arms 86 and 87, 88, 89 leading to the central horn and the array, respectively.

To achieve transmission through the central horn only, it is necessary to block the passage of R.F. energy to the array during transmission. This is accomplished by placing the nearest window of a conventional gas waveguide switch 89—i.e., T-R or pre-T-R cell—to a distance an exact multiple of a half wave length from the top of the septum in the feed leading to the array. On transmission, then, the energy going toward the array will ionize the gas cell, producing a short circuit at the window of the cell, which is reflected back to the tip of the septum 81, thus blocking the feed to the array on transmission. During reception, the gas cell 89 does not ionize, and both the array and center horn remain active.

Figure 14:
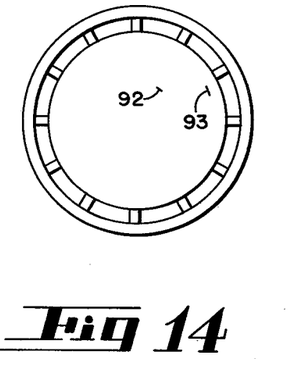
FIG. 14 is a schematic plan view of the display face of a plan-position indicator used with the invention, the same two targets being indicated.

At this point it has been shown how the system depends on the substantial absence of echo signals which occurs when the system is on target in elevation. The invention further provides means by which such absence of signals or null echo is utilized to furnish an indication of the target height. The received radio-frequency (R.F) signals are processed in the radar receiver 76, and the resultant video applied to a plan-position indicator 77 in conventional fashion. The structure and operation of indicators such as 77 and the manner in which they function to display in range and bearing such multiple targets as those indicated at 92 and 93 in FIG. 14 are well known to those skilled in the art and need not be described herein. Suffice it to say that, so far as range and azimuth are concerned, the system functions in a manner similar to a conventional radar equipped with P.P.I. display.

Figure 13:
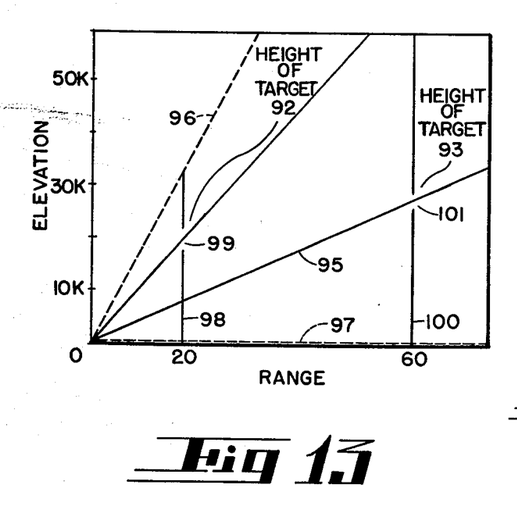
FIG. 13 is a schematic plan view of the display face of a range-height indicator employed with the invention, the presence and position of two targets being indicated.

The invention involves an appreciation that a range-height indicator 78 can be advantageously employed in combination with a radar receiver to utilize a null signal or absence of echo to furnish target height indication. In FIG. 13 there is shown in skeleton outline the display face of a range-height indicator 78 in which elevation is measured by ordinates and range by abscissae. It will be understood that a range height indicator includes a sweep signal generator, timed and triggered by the radar pulse generator, to provide a sawtooth sweep which is applied to the horizontal deflecting elements or coil of the cathode ray picture tube in the display. There is applied to the vertical deflecting elements a sawtooth deflecting wave controlled by the radar trigger, and this deflecting wave is modulated in accordance with the sine of the elevation angle of the null sector. To this end there is provided a sine function generating potentiometer 94 (FIGS. 1 and 8), the output of which modulates the vertical sawtooth voltage in accordance with the sine of the elevation angle. The result is that there appears on the display face of the range-height indicator 78 a trace 95 which nods between the angular positions 96 and 97 in synchronism and coordination with the nodding motion of the narrow-angled-pattern array.

Now, discussing target 92 of FIG. 13 for the moment, and reiterating that the main beam searches the target in azimuth with successive sweeps, and assuming further a fixed target, I synchronize the azimuth and nod motions (i.e., radar sweep and scan) in such a manner that the null sector always squarely hits a stationary target when the range-height indicator slant range time base 95 is in the same angular position. This time base is not longer than the period between pulse bursts of the radar transmission. The null sector is positioned at exactly the same elevation angle at a given bearing only once for every sixteen azimuthal sweeps and one hundred and twenty-seven nods, if an azimuthal sweep rate of 15.25 revolutions per minute and an elevation nod rate of one hundred and twenty-one nods per minute be assumed.

Bearing in mind that the azimuth and nod motions are synchronized, and that the output video signals of the radar receiver are applied to the control or intensity electrode of the cathode ray tube in the range-height indicator, then the presence of a fixed target such as 92 will cause to be displayed on the screen a vertical line 98, extending the full height of the display or to the point at which position line 96 is intercepted. This line 98 will be effectively "painted" in successive short segments, each segment corresponding to one azimuth traverse of the main search beam across the target and indicating hits by the main beam on a target at an indicated range. A null or absent-echo signal causes to occur a break 99 in the line 98, and this break is a measure of target height and indicates and displays the same. The abscissa of line 98 indicates target range.

Assume that the elevation angle of the null sector 71 is at zero degrees, that a target is at a fixed bearing and at an elevation angle of 14 degrees, that the angle of nod is 30 degrees, and that the main beam has just crossed the target in azimuth. At the end of the first sweep the elevation angle of the null sector will approximate 3¾ degrees. The null sector will have gone through almost eight nods. Just before the end of the fourth sweep the null sector will be on target in elevation, and break 99 will occur. At the end of the eighth sweep and sixty-three and one-half nods the elevation angle of the null sector will be 30 degrees. At the end of the ninth sweep the elevation angle of the null sector will be approximately 26¼ degrees, and that angle will continue to decrease with each sweep until it reaches zero at the end of the sixteenth sweep and the one hundred and twenty-seventh nod. A linear nod is here assumed, being more ready of explanation than the harmonic nod already reduced to practice.

Assuming a fixed target range of twenty miles, the video input to the range-height indicator display will cause a short segment of line 98 to be "painted" on the screen at the end of the first of the aforementioned sweeps. That is, when the search beam scored hits on the target at the end of this sweep, the slant range time base 95 will have moved from position 97 to a few degrees of elevation, and the incoming video causes a spot on the line to become luminous. The first segment of line 98 will accordingly be painted. When hits are scored by the search beam during the following sweeps, additional segments of line 98 will be painted until the top segment is painted during the eighth sweep, at which the elevation angle of the slant range time base 95 reaches its maximum at 96. While the angle between lines 96 and 97 is exaggerated in FIG. 15 for purposes of illustration, this discussion arbitrarily assumes a maximum elevation angle of 30 degrees. Now, then, from the ninth to the sixteenth sweeps, inclusive, the segments of line 98 are repainted in a descending direction. There is a break in line 98 at 99, representing the null echo-signal conditions which prevail when the null sector is precisely on target. That is to say, when there is no video—i.e., when the null sector is on target in elevation—the corresponding part of line 98 is not painted.

The numerical assumptions such as the azimuth and nod rates postulated in this explanation are given by way of illustration and not of limitation, and for the purposes of exemplifying the principles involved and describing operation. The invention is not at all limited to the data rates herein set forth. Additionally, while a fixed target was assumed for purposes of discussion, the invention is of utility not only with a fast moving target, but with a multiplicity of same.

Line 100 and break 101 similarly indicate the range and height of target 93.

I employ in range-height indicator 78 a cathode ray tube of the storage type.

Certain details of the specific embodiment of the invention will now be discussed. First making reference to FIG. 1, the reflector cylinder 21, which is linear in elevation and parabolic in azimuth, is supported on a conventional framework generally indicated by the reference numeral 104. The forty-eight small wave intercepting elements 23, 24, etc., are supported by a frontal member 105 of this framework and are vertically spaced and positioned along the focal axis of the reflector. The positions of the array elements 23, 24, etc., and reflector 21 relative to each other are fixed, but the entire ensemble of reflector and array elements is swingably mounted, for purposes of nodding, between heavy structural beams 106 and 107, which are rigidly secured in cantilever fashion to a rotatably mounted rectangular platform 108. Platform 108 is mounted for rotation in suitable shafting and bearings in a base 109, and the reflector and array elements and platform 108 are turned in azimuth by conventional chain and gearing arrangements 110, 111 driven by a prime mover or electric motor 113. The electric motor and associated conventional mechanisms also drive a shaft 114 which turns a crank 115 to actuate a connecting arm 116 which is pivotally secured to the framework 104 at 117 to nod the frame 104 and reflector and intercepting elements 23, 24, etc., in elevation.

Figures 7, 8:
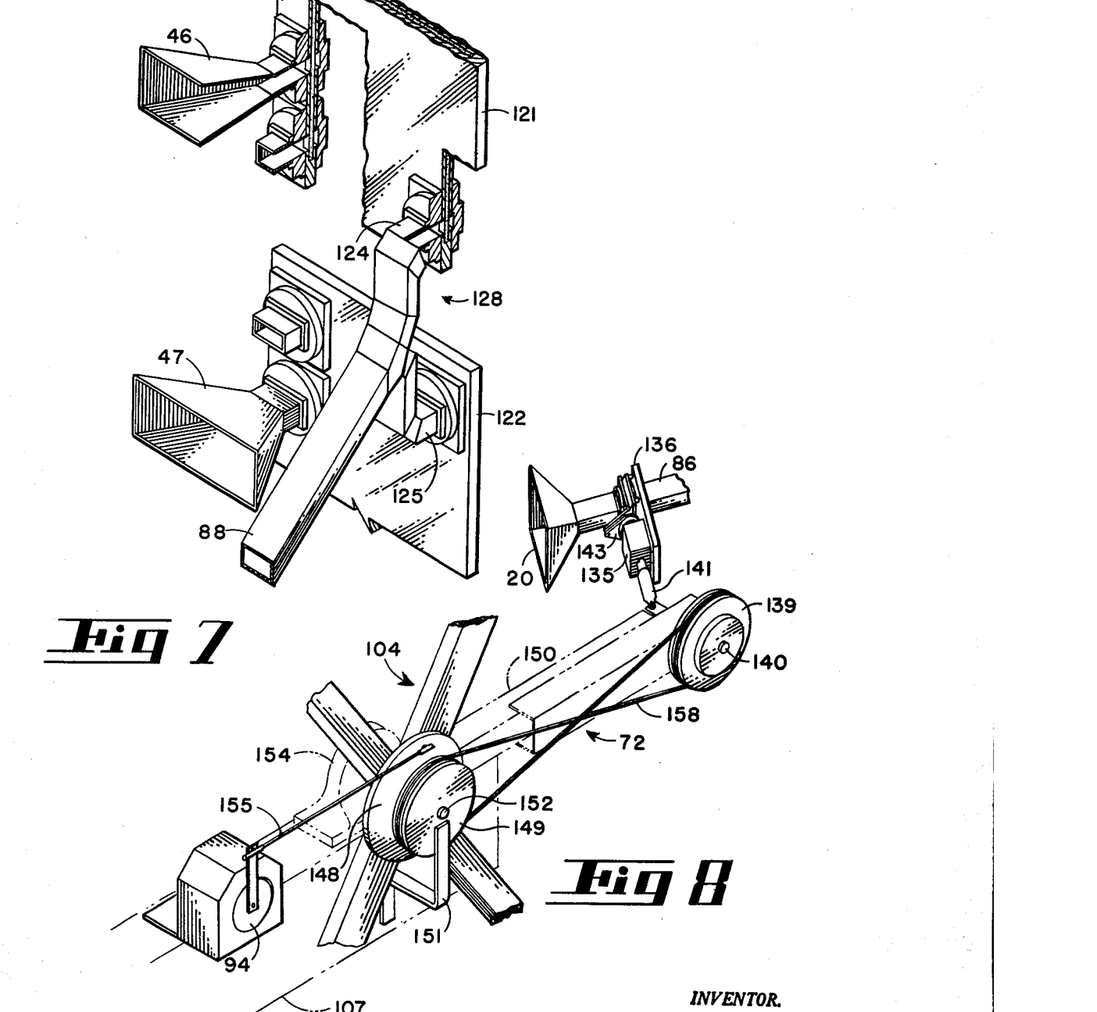
FIG. 7 is a perspective view of two of the small horns or spaced elements of the narrow-angled pattern receiving array included in an antenna system in accordance with the invention.
FIG. 8 is a perspective view of the central horn and the mechanical means for maintaining its elevational orientation constant.

Reference is now made to FIGS. 7 and 8 in connection with the following detailed description of the array of small wave intercepting horns 23, 24, etc. The horns 46 and 47 are selected for description, although it will be understood that all of the small metallic horns 23–70 are identical. The horns 23–46 are mounted on a triplate feed structure 121, and the horns 47–70 are mounted on a triplate feed structure 122. The waveguide 88, which conveys echo energy from the narrow-pattern receiving array to the radar receiver, is branched at its end and coupled to triplate 121 at 124, to accept energy from horns 23–46. The other branch is coupled to triplate 122 at 125 in similar fashion, in order to accept echo energy from horns 47–70.

Figures 10, 11:
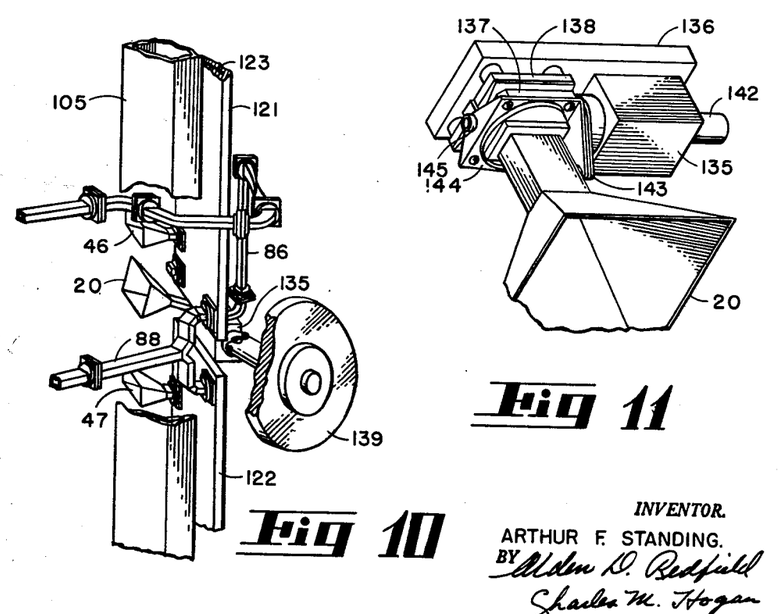
FIG. 10 is a perspective fragmentary view showing the arrangement of the central horn and the two elements of the narrow-pattern array which are immediately adjacent the central horn, together with a portion of the feed or "piping" associated therewith.
FIG. 11 is an enlarged fragmentary perspective view of the central horn and immediately associated elements.

Proceeding next to the description of the mode by which the central horn 20 (FIGS. 8, 10, and 11) is mounted in position, attention is invited to a bearing block 135 which is secured between plates 121 and 122, as best shown in FIGS. 10 and 11. Rigidly secured to one face of the bearing block 135 is a plate 136 which is apertured to receive and position waveguide 86. The mounting of horn 20 is complicated by reason of the fact that horn 20 is nodded in such a way as to maintain constant the orientation of the main beam in elevation even though the reflector 21 is nodded. To that end the horn 20 is secured to and mounted in member 137 of a combined electrical and mechanical hinge (i.e., a waveguide hinge joint). This joint comprises members 137 and 138, and member 138 is rigidly secured to plate 136. This arrangement permits the horn 20 to be moved with a nodded motion about an axis which is transverse to the longitudinal axis of the horn 20. The mechanism for nodding the horn independently comprises a pulley 139, shaft 140, universal joint 141, shaft 142, and crank arm 143 which actuates tilting plate 144 in such a way as to tilt member 137 on pivot 145 relative to member 138 (FIG. 11).

The main beam is stabilized or maintained constant in elevation by coordinating the nodding movements of the central horn 20 and the reflector 21. Referring to FIG.

8, the main frame 104 is mounted for nodding motion on a shaft 152 appropriately carried by a bearing 154 on cantilever member 107. Welded to frame 104 and disposed in concentric relation to shaft 152 is a plate 148. A link 155 secured to this plate actuates the sine function generating potentiometer 94. The plate 148 turns as the frame 104 nods. Mounted on shaft 152 is a pulley 149. The element 149 does not rotate as the frame 104 nods, because it is secured in fixed relation to cantilever 107 by a bracket 151.

The frame 104 includes a frontally extending member 150 which nods as a part of frame 104. Mounted on the outer end of element 150 is a shaft 140. Rigidly secured to that shaft is a pulley 139. Wheel 139 and shaft 140 turn relative to member 150 in order to nod central horn 20. Strung between pulleys 149 and 139 is a belt 158. The operation of this mechanism is such that, when frame 104 nods counter-clockwise (FIG. 8), the tension on the upper right-hand portion of belt 158 causes pulley 139 to turn counter-clockwise by an amount sufficient to maintain constant in elevation the central axis of the main beam as reflected from reflector 21. Conversely, when frame 104 nods clockwise, horn 20 is nodded clockwise.

The system is virtually unjammable by a single jammer, since it is only necessary to place the null on the jammer to find the jammer's angular position both in azimuth and elevation.

The system is unique in offering increasing positional accuracy on a jammer, the greater the jamming power put out by the target. This is a property not possessed by any other known radar system.

It has been noted in the foregoing discussion that the null signal is translated into terms of target height, and displayed on the face of a range-height indicator. This is accomplished without special detecting and video processing equipment. The cathode ray tube of the range-height indicator is intensity modulated by video from a conventional detector. This offers an additional advantage.

While the invention is not limited to the specific preferred embodiment shown, and while the parameters now mentioned are given by way of illustration and not of limitation, I have found the following parameters to be satisfactory in one successfully operating installation of the invention:

| | |
|---|---|
| Azimuthal sweep rate | 15.25 revolutions per minute. |
| Elevation nod rate | 121 nods per minute. |
| Angle of radiated beam in azimuth | 2.5 degrees. |
| Angle of radiated beam in elevation | 30 degrees. |
| Angle of nod | 30 degrees. |
| Angle of null sector | 0.6 degree. |
| Transmitted wave length | 3.3 centimeters. |
| Pulse repetition rate | 1000 pulses per second. |
| Pulse width | ¼ microsecond. |
| Vertical height of reflector | 10 feet 9 inches. |
| Width of reflector | 2 feet 10 inches. |
| Spacing between small elements 23, 24, etc. | 3/2λ. |
| Number of elements in array | 48. |
| Length of array | 8 feet. |

While there has been shown and described what is at present considered to be the preferred embodiment of the invention, it will be understood by those skilled in the art that various modifications and changes may be made therein without departing from the true scope of the invention as defined by the appended claims. For example, true null transmission is provided by simply omitting the gas switch 89 and using both the first antenna and the array for both transmission and reception.

Having fully disclosed my invention, I claim:

1. In a radar system, the combination of a first antenna proportioned to radiate a beam of electromagnetic energy having a relatively wide-angled directional pattern in one plane, a second antenna proportioned to have a narrow-angled directional pattern in said plane, transmitter means for energizing the first antenna to radiate said beam, means for steering the narrow-angled pattern to scan in said plane, the first antenna intercepting echo energy from a target located within said wide-angled directional pattern, both the first and second antennae intercepting echo energy from a target located within said narrow-angled directional pattern, and means for balancing the echo energy intercepted by the second antenna against the echo energy intercepted by the first antenna, so that a target located within said narrow-angled directional pattern indicates its presence by a resultant substantially zero signal or substantial absence of echo at the output of the last-mentioned means, a positional attribute of said target being indicated by the orientation of said narrow-angled directional pattern at the time of such indication.

2. In a radar system, the combination of means including a first antenna and proportioned to radiate a beam of electromagnetic energy having a relatively wide-angled directional pattern in one plane, a second antenna proportioned to have a narrow-angled directional pattern in said plane, means for steering the narrow-angled pattern to scan in said plane, the first antenna intercepting echo energy from a target located within said wide-angled directional pattern, both the first and second antennae intercepting echo energy from a target located within said narrow-angled directional pattern, and means for balancing the echo energy intercepted by the second antenna against the echo energy intercepted by the first antenna, so that a target located within said narrow-angled directional pattern indicates its presence by a resultant substantially zero signal or substantial absence of echo at the output of the last-mentioned means, a positional attribute of said target being indicated by the orientation of said narrow-angled directional pattern at the time of such indication.

3. The combination of a central horn and a reflector for radiating a beam of electromagnetic energy having a relatively wide-angled directional pattern in one plane, and means including said reflector and an array of horns aligned with the central horn for substantially nullifying echo signals in a narrow-angled portion of said plane.

4. The combination of means including a central horn and a reflector for radiating a beam of electromagnetic energy having a relatively wide-angled directional pattern in one plane, means including said reflector and an array of horns aligned with the central horn for substantially nullifying echo signals in a narrow-angled portion of said plane, and means for angularly varying the position of said portion in said plane.

5. In a radar system, the combination of means including a central radiating horn and a reflector for radiating a beam of electromagnetic energy having a relatively wide-angled directional pattern in elevation and a relatively narrow-angled directional pattern in azimuth, said reflector comprising a generally vertically oriented parabolic cylinder section, said horn being located on the focal axis of said reflector, an array of spaced radiating elements disposed along the focal axis of said reflector to provide, in conjunction with the reflector, a receiving directional pattern which is narrow in elevation and coextensive with the pattern of the radiated beam in azimuth, means for sweeping the ensemble of reflector and central horn and radiating elements in azimuth, means for stabilizing the elevational orientation of the central horn whereby said beam is swept in azimuth only, and means for nodding in unison the reflector and the radiating elements in elevation, whereby the receiving directional pattern scans in elevation within the wide-angled directional pattern of said beam.

6. The combination of radiating means for radiating a beam of electromagnetic energy having a broad directional pattern, a restricted pattern receiving array, the restricted pattern comprising an included geometrical portion of the broad pattern, means for combining echo signals intercepted by said radiator and said array so that a target within the pattern of the array and the beam of the radiator produces no effective echo signals, and means for shifting the angular position of the restricted pattern within the pattern of said beam.

7. The combination of means for radiating from a point a beam of electromagnetic energy having a relatively wide-angled directional pattern in one plane, means located proximate to said point for producing a null sector of relatively narrow angle in that plane, and means for varying the angular position of said null sector in said plane.

8. The method of radar detection which comprises the steps of radiating a relatively broad beam of energy having a relatively narrow null sector therein, azimuthally positioning the broad beam pattern, and varying the elevation of said sector.

9. The combination of means including a reflector and a central horn for radiating a single beam of electromagnetic energy and means including said reflector and an array of horns aligned with said central horn for producing a null sector in that beam.

10. The combination of means for radiating a beam of electromagnetic energy, means for sweeping the beam in one coordinate direction, means including a detector for utilizing echo signals from a target in the path of said beam to determine a positional attribute of that target, means for producing a null sector and scanning the null sector across said beam in another coordinate direction, and means responsive to the substantial absence of detected echo signals which occurs when the null sector is on said target to determine another positional attribute of the target.

11. The combination in accordance with claim 10 in which the last-named means is a range-height indicator having a slant range time base, the rates of sweeping and scanning being so coordinated that the null sector always crosses a stationary target when the slant range time base is in the same angular position.

12. The combination of means for radiating a beam of electromagnetic energy and means for producing an effective null sector in that beam, the last-named means including a parabolic cylinder reflector and a plurality of horns positioned along the focal axis of said reflector and spaced from each other by three half-wave lengths.

13. The combination in accordance with claim 12 in which the first-named means includes a central horn and reflector, the reflector being common to the second-named means.

14. The combination of means for radiating a beam of electromagnetic energy, means for turning the beam in one coordinate direction, means utilizing echo signals from a target in the path of said beam to determine a positional attribute of that target, means for producing a discontinuity in said beam and scanning said discontinuity across said beam in another coordinate direction, and means responsive to the radical change of detected echo signals which occurs when the discontinuity is on target for determining another positional attribute of that target.

15. In a radar system, the combination of a narrow-pattern wave interceptor including a parabolic reflector and horns, a wide-pattern wave interceptor including the same reflector, and means for differentially combining echo signals intercepted by said interceptors when both patterns are on target.

16. The combination in accordance with claim 15, and transmitter means coupled to the wide-pattern interceptor for radiating a wide-pattern beam.

References Cited in the file of this patent

UNITED STATES PATENTS

| | | |
|---|---|---|
| 1,357,210 | Robinson | Oct. 26, 1920 |
| 2,406,734 | Alford | Sept. 3, 1946 |